(No Model.)

E. C. STORROW.
INTERIORLY LINED PIPE.

No. 590,811. Patented Sept. 28, 1897.

Witnesses:
Arthur L. Randall.
L. M. Bartlett.

Inventor:
Edward C. Storrow.
by B. J. Noyes
Atty

UNITED STATES PATENT OFFICE.

EDWARD C. STORROW, OF BOSTON, MASSACHUSETTS.

INTERIORLY-LINED PIPE.

SPECIFICATION forming part of Letters Patent No. 590,811, dated September 28, 1897.

Application filed December 22, 1896. Serial No. 616,621. (No model.)

*To all whom it may concern:*

Be it known that I, EDWARD C. STORROW, of Boston, in the county of Suffolk and State of Massachusetts, have invented an Improvement in Interiorly-Lined Pipe, of which the following description, in connection with the accompanying drawings, is a specification, like letters on the drawings representing like parts.

In connecting together sections of lead-lined pipe or other interiorly-lined pipe interiorly-lined couplings have been employed, and in order that the interior or lining joints may be made tight special couplings have been employed and the ends of the sections of pipe have been covered or protected, so that when such sections of pipe are connected by such a specially-formed coupling the interior lining of the several parts is intact and continuous.

In connecting together sections of interiorly-lined pipe by means of interiorly-lined couplings in such a manner as to insure tight joints a great deal of care must be taken to bring the lining of the several parts into intimate contact.

This invention has for its object to provide means for protecting the connecting-joints of several interiorly-lined parts which does not require that the lining of said several parts shall be brought into intimate contact or engagement at the joints in order that the parts may be protected at such points; and the invention consists in providing interior joint-protecting thimbles at the connecting-joints—as, for instance, there may be a joint-protecting thimble driven into or inserted at each end of each section of pipe, being held in firm contact or engagement with the interior lining thereof, said thimbles projecting a suitable distance, and when two sections of pipe thus provided with joint-protecting thimbles are connected together by an interiorly-lined coupling the projecting ends of the thimbles will be pressed into and brought into engagement or firm contact with the interior lining of the coupling, or each coupling may have two interior joint-protecting thimbles contained within it and projecting from it in opposite ways and adapted to be pressed into the ends of the interiorly-lined pipe and thus brought into engagement or firm contact with the interior lining thereof, or said coupling may have a single interior joint-protecting thimble contained within it which shall be made long enough to project at opposite ways sufficiently and in such manner as to enter the sections of interiorly-lined pipe and engage the lining thereof.

Figure 1:
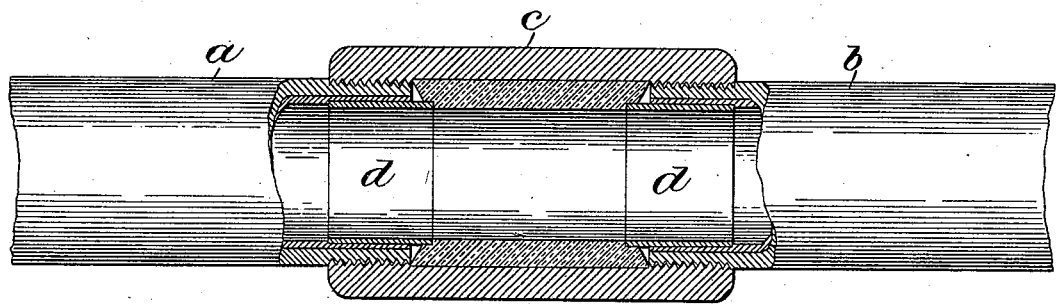
Figure 2:
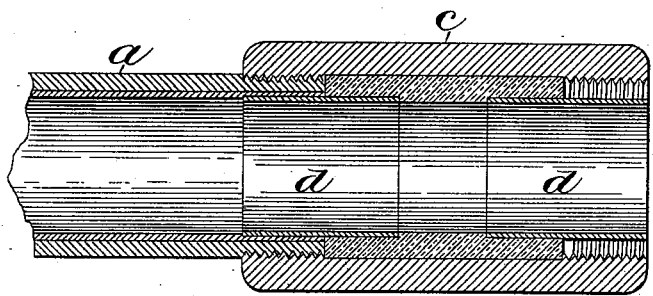

Figure 1 shows in longitudinal section two broken-off sections of interiorly-lined pipe and an interiorly-lined coupling and two interior joint-protecting thimbles inserted at the ends of the sections of pipe and projecting therefrom. Fig. 2 shows a similar view wherein the two joint-protecting thimbles are attached to the coupling and caused to enter the sections of interiorly-lined pipe when the parts are connected together, and Fig. 3 a similar sectional view wherein a single joint-protecting thimble is employed in lieu of the two thimbles shown in the previous figures.

$a$ $b$ represent two sections of interiorly-lined pipe—as, for instance, they may be lead-lined-iron pipe.

$c$ represents an interiorly-lined coupling constructed to connect the two sections $a$ $b$ of pipe together.

$d$ $d$ represent joint-protecting thimbles, they being made of brass or any other suitable material and driven into or otherwise inserted at the ends of the sections of pipe and thus brought into engagement or firm contact with the interior lining thereof, and made of suitable length to project a short distance beyond the ends of said sections of pipe. When the parts, constructed as herein shown, are coupled together, the joint-protecting thimbles $d$ $d$ will be pressed into and thus brought into firm contact or engagement with the interior lining of the coupling, and therefore form a tight interior or lining joint. These joint-protecting thimbles also serve as a means of locking or holding the lining at the ends of the sections of pipe and incidentally keep the lining from working out of the sections of pipe.

The coupling $c$ will have a lining with beveled or other shaped ends against which the thimbles abut, and as said lining is usually made of a soft material said thimbles can be easily jammed more or less into said lining to insure a tight joint.

Referring to Fig. 2, the two joint-protecting thimbles $d\ d$ are held in engagement or firm contact with the interior lining of the coupling and caused to project in such manner as to enter the sections $a\ b$ of pipe when the parts are coupled together and to at such times engage or firmly contact with the interior lining of said sections, thereby forming a tight joint, and said thimbles serve to lock or hold the lining in the coupling and when in engagement with the lining in the sections of pipe will also assist in holding the lining at such points. When the thimbles are thus held in and by the coupling, they will be jammed into or abut against the end of the lining in the sections of pipe to form tight joints.

Figure 3:
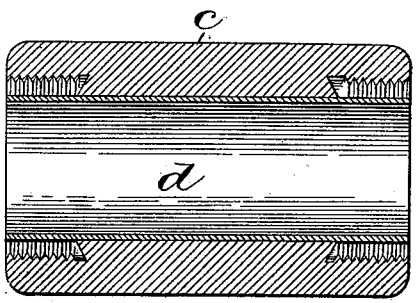

Referring to Fig. 3, a single joint-protecting thimble $d$ is contained within the coupling $c$ and made long enough to extend from end to end of said coupling and to project in opposite ways sufficiently to enter the ends of the sections $a\ b$ of pipe when the parts are coupled together. When the thimble is made to thus extend entirely through the coupling $c$, said coupling need not be previously lined and the thimble may be expanded or otherwise secured in place, and its projecting ends will abut against or be jammed into the ends of the lining of the sections, and to thus engage or firmly contact therewith to form a tight joint.

In either case it will be seen that a tight joint can be made, and, further, that the construction is simple and the parts easily coupled together. Herein the part $c$ is referred to as a "coupling;" but it will be understood that said part may be a union or fitting of any other kind.

I claim—

Two sections $a$, $b$, of interiorly-lined pipe, and a coupling union, or fitting, and one or more interior joint-protecting thimbles $d$ for the connecting-joints, which project into the interiorly-lined sections $a$, $b$, and are held in engagement with the lining thereof, to form a tight joint, and which assist in holding said lining in place, substantially as described.

In testimony whereof I have signed my name to this specification in the presence of two subscribing witnesses.

EDWARD C. STORROW.

Witnesses:
B. J. NOYES,
L. M. GARBUTT.